June 20, 1950 G. H. LEE 2,511,860
FREQUENCY MODULATIÓN SYSTEM
Filed May 15, 1946

INVENTOR.
George H. Lee

Patented June 20, 1950 2,511,860

UNITED STATES PATENT OFFICE 2,511,860

FREQUENCY MODULATION SYSTEM

George H. Lee, Troy, N. Y.

Application May 15, 1946, Serial No. 669,810

30 Claims. (Cl. 332—7)

This invention relates to signalling systems, and more particularly, to such systems employing phase or frequency modulation of a carrier wave, that is, modulation of the phase or the frequency of a carrier wave in accordance with a signal which may represent sound or light or any other phenomenon that it is desired to transmit electrically.

The present invention provides novel and compact apparatus, most of the elements of which may be contained within a single electric discharge tube, for producing such a phase or frequency modulated signal. This apparatus is particularly adapted to operate at ultra-high frequencies, that is, where the carrier wave is of the order of $10^{10}$ cycles per second. In accomplishing the desired modulation, the sinusoidal standing wave pattern of electric field intensity which is set up in an oscillating cavity resonator is utilized.

Accordingly, an object of the present invention is to provide novel and compact electric discharge apparatus for modulating either the phase or frequency of a carrier wave in accordance with an input signal.

Another object of the present invention is to provide a phase or frequency modulating system adapted particularly to operate in the case where the carrier wave lies in the ultra-high frequency region.

Still another object of the present invention is to provide a phase or frequency modulating system utilizing cavity resonant apparatus as elements of the system.

A still further object of the present invention is to provide cavity resonant apparatus for velocity modulating a traversing electron beam in accordance with a sinusoidal function of the position at which the electron beam traverses the resonator.

Still another object of the invention is to provide a method of deriving a sinusoidal function of a variable quantity electrically wherein the standing wave pattern of an oscillating electric field is utilized to obtain the sinusoidal characteristic.

Other objects and advantages of the present invention will become apparent from the following description, taken in connection with the accompanying drawings, wherein the invention is embodied in concrete form.

Figure 1:
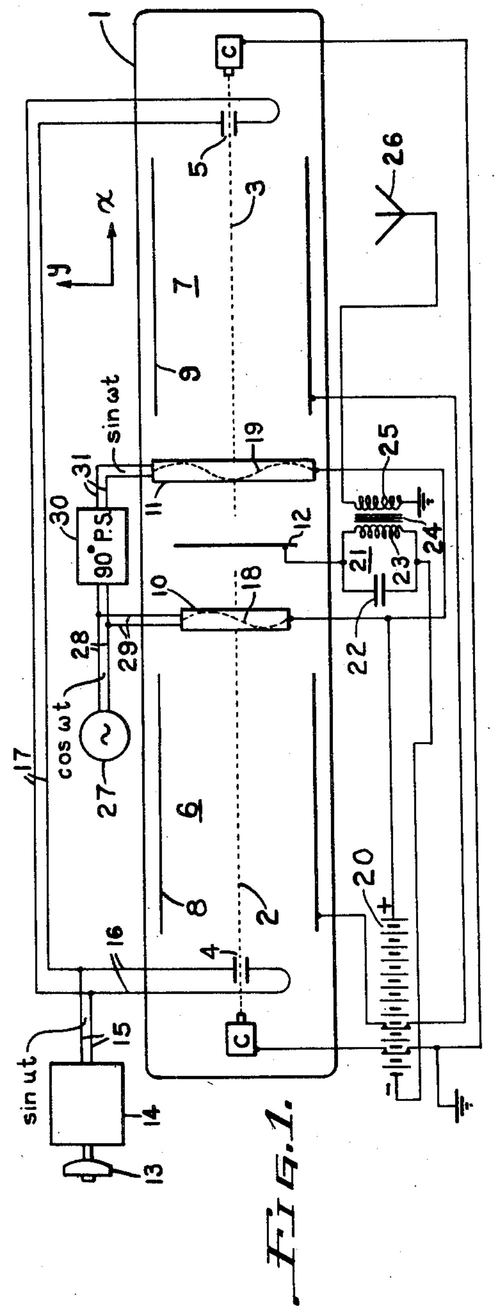
Fig. 1 is a schematic diagram illustrating one form of the present invention.

The arrangements shown in the drawings are in the main largely diagrammatic and consist only of those features which are necessary to a complete understanding of the invention. The various supporting structure and auxiliary equipment may take any suitable form known to those skilled in the art. Such structure and equipment, which form no part of the present invention, have not been shown since so doing would serve only to obscure rather than to disclose the invention.

In Fig. 1 of the drawings, a convention with respect to directions is set up in the form of a rectangular coordinate system having the axes $x$, $y$, and $z$, the $x$ axis being horizontal in the plane of the paper, the $y$ axis being vertical in the plane of the paper, and the $z$ axis, not shown, being understood to be horizontal and perpendicular to the $x—y$ plane. This coordinate system, which is specifically set out in order to facilitate the explanation of the operation of the cavity resonators, is the same as is followed in chapter 10 of "Hyper and Ultra-High Frequency Engineering" by Sarbacher and Edson, published by John Wiley & Sons, Inc., September, 1944. The convention employed in that publication for defining resonant modes of oscillation within a cavity resonator is also followed throughout this specification.

A pure phase modulated wave may be mathematically represented by the expression:

$$\sin(\omega t+\sin ut)$$

wherein $\omega$ represents $2\pi$ times the frequency of the carrier, $t$ represents time, and $u$ represents $2\pi$ times the frequency of the modulating signal. This expression, by trignometric methods, may readily be shown to be equal to the following expression:

$$(1)\qquad \sin \sin ut\cdot\cos \omega t+\cos \sin ut\cdot\sin \omega t$$

In the apparatus of Fig. 1, each of the separate terms of this latter expression are derived independently and then additively combined to form the desired phase modulation.

Referring now to Fig. 1, there is shown an evacuated envelope or container 1 within which an electric discharge takes place. At opposite ends of container 1 are two identical electron guns or cathodes C. It will be understood that electron guns C include all necessary or desirable incidental equipment ordinarily associated therewith, such as collimating, focussing, and control electrodes, and so forth. Cathodes C are thus adapted to produce inwardly directed electron beams 2 and 3 of an identical velocity and intensity. Electron beams 2 and 3 traverse respective pairs of deflecting plates 4 and 5, and then enter respective drift spaces 6 and 7 which may be provided by electrode structures 8 and 9, respectively. Electrode structures 8 and 9 may be in the form of hollow cylinders, as schematically shown, or they may take any other form suitable for producing a drift space of constant potential. Upon emergence from drift spaces 6 and 7, respectively, electron beams 2 and 3 traverse cavity resonators 10 and 11, respectively. Cavity resonators 10 and 11, which will be more fully described hereinafter, will be understood to be provided with suitable entrance and emergence grids elongated somewhat in the direction of beam deflection ($y$ direction) for accommodating all of the traversing electron beams. Upon emergence from cavity resonators 10 and 11, respectively, electron beams 2 and 3 are decelerated to a zero horizontal velocity by means of a common retarding electrode 12 which is maintained at a negative potential.

In this case, the modulating signal is assumed, for example, to be an audio signal originating at a microphone 13 and represented as proportional to the quantity sin $ut$. This audio signal may be amplified in a suitable audio amplifier 14 from which it emerges on leads 15. Leads 15 are connected, as by leads 16, to the opposite plates of deflecting pair 4, and also, as by leads 17, to opposite plates of deflecting pair 5, so that electron beams 2 and 3 are identically deflected in the $y$ direction in accordance with the input signal sin $ut$.

Reference numeral 20 represents a direct voltage supply, indicated as a battery. A point near, but on the positive side of, the negative terminal of battery 20 is grounded, as shown, and is also connected to both cathodes C. Electrodes 8 and 9 are both connected, as shown, to a point in battery 20 on the positive side of ground so that the drift spaces 6 and 7 are maintained at a reasonable positive potential with respect to the cathodes C and ground. Cavity resonators 10 and 11 are both connected to the positive terminal of battery 20, as shown. Retarding electrode 12 is connected to one side of a parallel resonant tank circuit, indicated generally at 21, and consisting of condenser 22 and the primary winding 23 of transformer 24. The opposite side of tank circuit 21 is connected to the negative terminal of battery 20, whereby retarding electrode 12 is maintained at a negative potential with respect to ground. Tank circuit 21 is tuned to resonate at the carrier frequency at which cavity resonators 10 and 11 oscillate.

As will later be described in detail, the resonant current in tank circuit 21 will correspond to the desired pure phase modulated signal. This signal is picked up by transformer 24 and appears across its secondary winding 25, one terminal of which is connected to ground, and the other terminal of which is connected to an antenna, designated at 26, whereby the desired phase modulated carrier wave is radiated from antenna 26. The modulated carrier wave can be amplified, of course, prior to being connected to antenna 26 if greater radiating power is desired.

Reference numeral 27 designates an alternating generator adapted to produce on its output leads 28 a suitable high frequency carrier wave which is represented as proportional to cos $\omega t$. Leads 28 connect, as by leads 29, directly to a suitable coupling probe or loop, not shown, extending within cavity resonator 10 so as to excite this resonator to resonate at the carrier frequency in a particular mode, as will hereinafter be described.

Leads 28 also provide the input to a phase shift network 30 which is adapted to produce on its output leads 31 an alternating wave of the same frequency as the input wave but shifted 90° in time phase with respect thereto. The output signal appearing on leads 31 may thus be represented as proportional to sin $\omega t$, and this signal is connected through a suitable coupling probe or loop to excite cavity resonator 11.

Cavity resonators 10 and 11 are adapted to resonate in a transverse electric resonant mode. The convention employed in the previously referred to publication of Sarbacher and Edson to designate particular resonant modes of oscillation in a cavity resonator will be employed herein. According to this convention, $TE_{nm1}$ represents the general transverse electric mode, wherein the $n$ subscript represents the number of maxima of electric field intensity which occur in the standing wave pattern along the $y$ direction, the $m$ subscript represents the number of maxima along the $z$ direction, and the 1 subscript represents the number along the $x$ direction.

Cavity resonators 10 and 11 are each adapted to resonate in a resonant mode of oscillation of the general class $TE_{nm0}$. In such a resonant mode of oscillation, the only vector of electric field intensity present is in the $x$ direction parallel to the traversing electron beams, and at a particular instant of time, this electric field intensity is constant across the resonator in the $x$ direction. In order to provide such a resonant mode of oscillation, the $x$ dimension of resonators 10 and 11, both of which may be of a rectangular shape, is not critical. However, for reasons which will later become apparent, the dimension of these two resonators in the $x$ direction is preferably sufficiently short that the transit time of the electron beams through the resonators is less than one half of a period of the carrier frequency.

Preferably, cavity resonator 10 is so energized, and has dimensions related to the guide wave length corresponding to the carrier frequency, such that a $TE_{210}$ resonant mode of oscillation is set up therein. In order for cavity resonator 10 to sustain such a mode of oscillation, if it be rectangular in shape, the dimension in the $y$ direction must be equal to a whole guide wave length, and the dimension in the $z$ direction must be equal to a half guide wave length. It will be understood, however, that it is not necessary for a $TE_{210}$ mode of oscillation of the general class $TE_{nm0}$ to be employed, the only restriction on the resonant mode employed being defined by the requirement that the electron beam 2, when undeflected, must pass through an $x$—$z$ plane which contains a node of the electric field intensity pattern existing along the $y$ direction, that is, the direction of electron beam deflection. Also, for maximum utilization of the electric field within the resonator, the electron beam should pass through an $x$—$y$ plane containing a maximum of the electric field intensity pattern existing along the $z$ direction. It will be apparent that a $TE_{210}$ resonant mode of oscillation is the simplest mode meeting the above requirements. Reference numeral 18 represents the standing wave pattern of electric field intensity along the $y$ direction, and it will be apparent that the undeflected electron beam 2 will intercept a node of this pattern. It will be understood that the electron beam 2 traverses the central $x—y$ plane of the resonator, so that if the $m$ subscript of the resonant mode employed is equal to one, then the beam will intercept a maximum of the standing wave pattern along the $z$ direction.

Preferably, cavity resonator 11 is so energized, and has dimensions related to the guide wave length corresponding to the carrier frequency, such that a $TE_{310}$ resonant mode of oscillation is set up therein. In order for cavity resonator 11 to sustain such a mode of oscillation, if it be rectangular in shape, the dimension in the $y$ direction must be equal to one and one half guide wave lengths, and the dimension in the $z$ direction must be equal to a half guide wave length. It will be understood, however, that it is not necessary for a $TE_{310}$ mode of oscillation of the general class $TE_{nm0}$ to be employed, the only restriction on the resonant mode employed being defined by the requirement that the electron beam 3, when undeflected, must pass through an $x—z$ plane which contains a maximum of the electric field intensity pattern existing along the $y$ direction, that is, the direction of beam deflection. Also, for maximum utilization of the electric field within the resonator, the electron beam should pass through an $x—y$ plane containing a maximum of the electric field intensity pattern existing along the $z$ direction. It will be apparent that a $TE_{310}$ resonant mode of oscillation is a simple mode meeting the above requirements. Reference numeral 19 represents the standing wave pattern of electric field intensity along the $y$ direction, and it will be apparent that the undeflected electron beam 3 will intercept a maximum of this pattern. It will be understood that the electron beam 3 traverse the central $x—y$ plane of the resonator, so that if the $m$ subscript of the resonant mode employed is equal to one, then the beam will intercept a maximum of the standing wave pattern along the $z$ direction.

For concreteness with respect to the explanation, and to facilitate understanding of the operation of the invention, cavity resonators 10 and 11 have been shown and described as rectangular in shape. However, it will be apparent to anyone familiar with the theory of operation of cavity resonators that many different shapes might be employed to provide the desired resonant modes of oscillation.

Considering now the operation of the device, the electrons emerging from the electron guns C will initially be accelerated to a horizontal velocity corresponding to the positive potential of electrodes 8 and 9, and will then proceed through drift spaces 6 and 7, respectively, at this constant horizontal velocity. Upon emergence from drift spaces 6 and 7, electron beams 2 and 3 will again be accelerated to the much higher horizontal velocity corresponding to the high positive potential of resonators 10 and 11. The electrons will proceed through the resonators at this constant high velocity. It will be apparent that the number of electrons per second entering resonators 10 and 11 will be constant; that is, the electron beam entering the resonators is continuous and of a constant current value. During their traversal of resonators 10 and 11, the beams will be operated upon by the alternating electric field within the resonators so that upon emergence from resonators 10 and 11, the beams will be velocity modulated in a manner similar to the traversing beam of a Klystron buncher stage. The emergent electrons will then tend to proceed on toward the retarding electrode 12. However, since electrode 12 is maintained at a negative potential with respect to the reference or cathode potential, no electrons will have sufficient energy to impinge upon electrode 12, but rather, they all will be stopped at some intermediate point depending upon their particular velocity. Suitable deflecting means, not shown, may be provided so that the retarded electrons will not return and retraverse the cavity resonators 10 and 11 and interfere with their operation.

As previous stated, the electrons, in traversing deflecting pairs of plates 4 and 5, will experience a vertical velocity in the $y$ direction in accordance with the audio signal $\sin ut$. The drift spaces 6 and 7 are sufficiently elongated in the $x$ direction so that the electrons will have experienced substantial vertical displacements as a result of their vertical velocities by the time they emerge from drift spaces 6 and 7. During the traversal of resonators 10 and 11, the horizontal velocities of the electrons are so large in proportion to their vertical velocities that it can be considered that the electrons proceed through resonators 10 and 11 in a substantially horizontal direction. The displacement $d$ in the $y$ direction of successive electrons traversing resonators 10 and 11 with respect to the normal or undeflected point of traversal (the center of the resonators as shown) will be proportional to the audio signal $\sin ut$.

As developed in the theoretical treatment of the Klystron, the velocity of successive electrons emerging from resonator 10, having traversed the resonator through an $x—z$ plane containing a maxima of the electric field intensity pattern along the $y$ direction, may be given by the expression: $V_0+V_1 \cos \omega t$, wherein $V_0$ is equal to the common velocity of all of the electrons as they enter the resonator and $V_1$ is a constant depending upon the maximum electric field intensity within the resonator. In this expression, the final term $V_1 \cos \omega t$ may be thought of as the velocity modulation.

Due to the sinusoidal character of the electric field intensity standing wave pattern 18 in the $y$ direction, the velocity modulation of an emergent beam which traverses resonator 10 at any $x—z$ plane a distance $d$ from the center of the resonator may be given by the expression $V_1 \sin d \cdot \cos \omega t$. Since the displacement $d$ at which the actual electron beam 2 traverses resonator 10 may be represented by $\sin ut$, the actual velocity modulation of electron beam 2, as it emerges from resonator 10, may be given by the expression $V_1 \sin \sin ut \cdot \cos \omega t$.

Similarly, due to the sinusoidal character of the electric field intensity standing wave pattern 19 in the $y$ direction, the velocity modulation of an emergent beam which traverses resonator 11 at any $x—z$ plane a distance $d$ from the center of the resonator may be given by the expression $V_1 \cos d \cdot \sin \omega t$. Since the displacement $d$ at which the actual electron beam 3 traverses resonator 11 may be represented by $\sin ut$, the actual velocity modulation of electron beam 3, as it emerges from resonator 11, may be given by the expression $V_1 \cos \sin ut \cdot \sin \omega t$.

It will be apparent that the velocity modulations of beams 2 and 3, as they emerge from resonators 10 and 11, are representative of the two terms of expression (1), respectively. Accordingly, in order to obtain a pure phase modulated signal, all that is required is that these velocity modulations be converted into corresponding current variations and these current variations then additively combined. Various methods are known for converting a velocity modulation into a corresponding current variation, among which are those known as the deflection method, the retarding field method, and the drift tube method, the latter being the type employed in the Klystron. Although any of these methods could be employed, in the present case, for the purposes of example, the retarding field method is used, this method constituting a convenient manner of simultaneously additively combining the velocity modulations of the beams 2 and 3. Thus, as previously stated, due to the negative potential of retarding electrode 12, all electrons of both beams are retarded to a zero velocity at points intermediate the resonators and the electrode 12, the particular point at which any particular electron is stopped depending upon its emergent velocity. Due to the charge which is induced on plate 12 as a consequence of the approach of electrons thereto, current will flow into and out of this electrode in accordance with the velocity modulation of the beams 2 and 3. Moreover, this action will take place for both beams 2 and 3 independently of the other beam. Therefore, the current which is caused to flow through tank circuit 21 will correspond to the sum of the velocity modulations of beams 2 and 3. Accordingly, the current which is induced in the secondary winding 25 of transformer 24 will be a pure phase modulated current, as represented mathematically by expression (1), and the signal radiated from antenna 26 will be a pure phase modulated carrier wave, the phase modulation being in accordance with the audio signal originating at microphone 13.

Figure 2:
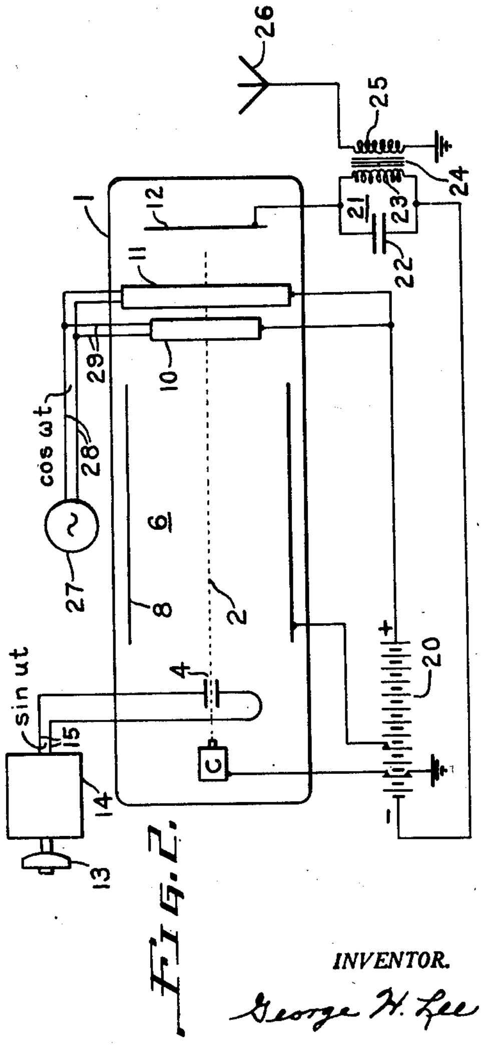
Fig. 2 is a schematic diagram illustrating another form of the present invention.

Referring now to the apparatus of Fig. 2, wherein the two velocity modulations corresponding to the respective terms of expression (1) are superimposed on but one electron beam, identical apparatus to that constituting the left-hand half of Fig. 1, and including the retarding electrode 12, is provided. This apparatus operates exactly as was described with respect to the corresponding portion of Fig. 1 so that electron beam 2 emerges from cavity resonator 10 with a velocity modulation which may be represented by the expression $V_1 \sin \sin ut \cdot \cos \omega t$.

In the apparatus of Fig. 2, however, the cavity resonator 11 is positioned between cavity resonator 10 and retarding electrode 12 so as to be traversed by the already once velocity modulated electron beam emerging from cavity resonator 10. A second or additional velocity modulation is thus superimposed upon the electron beam. In this case, no 90° phase shifting network is required, and the coupling probe or loop of cavity resonator 11 is connected directly to lead 28, along with cavity resonator 10, so as to be energized in accordance with the carrier wave signal represented by $\cos \omega t$. The distance between the emergent grid of cavity resonator 10 and entrance grid of cavity resonator 11 is critically adjusted with relation to the velocity of the electron beam such that the electron transit time therebetween is exactly equal to a quarter of a period of the carrier frequency. Accordingly, it will be apparent that as far as the traversing electrons are concerned, the oscillations within resonators 10 and 11 are 90° phase displaced with respect to each other. Here again, then, the velocity modulation superimposed on electron beam 2 by cavity resonator 11 may be represented by the expression $V_1 \cos \sin ut \cdot \sin \omega t$.

Thus, in the operation of Fig. 2, the two terms of expression (1) are additively combined by superimposing velocity modulations corresponding to these terms, respectively, upon the same electron beam 2. As before, the total velocity modulation of electron beam 2 is converted into a corresponding current variation by means of retarding electrode 12 and its associated circuit. As before, the current oscillating in tank circuit 21 corresponds to the desired pure phase modulated wave, and this signal is radiated by means of antenna 26.

It should not be inferred that in the apparatus of Figs. 1 and 2 the signal radiated from antenna 26 is not also a frequency modulated signal. As is well known, a pure phase modulated signal is merely a special kind or class of frequency modulated signal wherein the frequency of the carrier wave, in addition to being displaced from a reference value in proportion to the modulating signal, is also displaced from this reference value in proportion to the frequency of the modulating signal. If it is desired, to modify the apparatus of Figs. 1 and 2 in order to provide a pure frequency modulated signal, that is, one in which the frequency is displaced from its reference value solely in proportion to the modulating signal, the apparatus of Fig. 3 may be employed.

Figure 3:
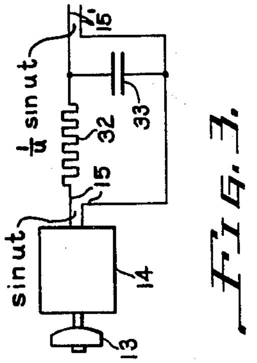
Fig. 3 is a schematic diagram illustrating a modification which may be applied to the apparatus of Figs. 1 and 2 in order to provide pure frequency modulation rather than pure phase modulation.

As shown in Fig. 3, there are connected in series across output leads 15 of amplifier 14, a resistor 32 and a condenser 33. Output leads 15' are connected across the terminals of condenser 33, and these leads 15' may then be connected to the deflecting pairs of plates 4 and 5 of Figs. 1 and 2. As is well known, the impedance of condenser 33, and therefore the voltage developed across the terminals thereof, is inversely proportional to the operating frequency. Accordingly, the audio signal represented by $\sin ut$, which appears on leads 15, will produce on output leads 15' a signal which may be represented by $$\frac{1}{u} \sin ut$$

Now, when the audio signal represented by $$\frac{1}{u} \sin ut$$

appearing on leads 15' is connected to the deflected pairs of plates 4 and 5 of either Fig. 1 or 2, the apparatus will operate in the manner previously described to provide an output carrier wave having a pure phase modulation in accordance with the signal $$\frac{1}{u} \sin ut$$

But such a pure phase modulated carrier wave will be identical to a carrier wave having a pure frequency modulation in accordance with the audio signal $\sin ut$. Thus, if desired, by employing the apparatus of Fig. 3 in conjunction with that of Figs. 1 or 2, a pure frequency modulated carrier wave output signal, modulated in accordance with the audio signal originating at microphone 13, may be radiated from antenna 26.

In the construction of apparatus according to the principles of the invention, it is expected that any and all customary or desirable features normally employed in the art may be resorted to in order to specifically adapt the apparatus to a particular application. In particular, in order to clarify the connections and facilitate the tracing of signals, all of the wiring and apparatus associated with the carrier wave, other than the cavity resonators 10 and 11, have been illustrated as of the conventional type ordinarily associated with somewhat lower frequencies. It will be clearly understood that, in this connection, coaxial cables or wave guides may replace the conventional two wire transmission channels shown, and a cavity resonator or quarter wave length transmission line may replace the conventional parallel resonant tank circuit 21, if the operating frequencies warrant. Also, it will be clear from the above description that the function of drift spaces 6 and 7, provided by electrodes 8 and 9, respectively, is essentially that of an amplifier for the audio signal. If the audio signal is sufficiently powerful in a particular application, this portion of the apparatus would, of course, be unnecessary.

From the foregoing, it will be realized that in its broadest aspect, the invention lies in the utilization of the sinusoidal spatial characteristic of the standing wave pattern which is established within any oscillatory electric field, such as within an excited cavity resonator. The present inventor has realized that by controlling the point along the standing wave at which an electron traverses a cavity resonator, the interchange of energy between the electron and the electric field within the resonator can be controlled, and that this phenomenon may be usefully employed. This concept may be advantageously applied to many different applications other than the one described herein. For instance in copending U. S. appl. Serial No. 669,811 for Ultra-High Frequency Vacuum Tube, filed on May 15, 1946, in the name of the present inventor, the frequency of the deflecting voltage is identical to that of the cavity resonator, whereby an improved general purpose vacuum tube for high frequencies is obtained.

In the foregoing description, and in the appended claims, it has been found desirable to employ the phraseology "standing wave pattern of electric field intensity in one direction," "standing wave pattern of electric field intensity along one direction" and similar phraseology. Whenever such phraseology is used, the "direction" referred to is that which extends along the axis of the standing wave pattern, which direction is perpendicular, and not parallel to, the actual direction of the electric field.

Since many changes could be made in the above construction and many apparently widely different embodiments of this invention could be made without departing from the scope thereof, it is intended that all matter contained in the above description, or shown in the accompanying drawings, shall be interpreted as illustrative and not in a limiting sense.

What is claimed is:

1. In a method of deriving a sinusoidal function of a variable quantity electrically, in combination, the steps of establishing an oscillating region containing a standing wave pattern of electric field intensity in at least one direction, continuously projecting electrons through said region at a constant rate in a direction substantially parallel to the electric field, varying the line of traversal of said region by the beam formed of said electrons in direct proportion to said variable quantity, whereby the amplitude of the velocity modulation of said beam upon emergence from said region is substantially representative of a sinusoidal function of said quantity, and deriving a voltage signal corresponding to the velocity modulation of said beam upon its emergence from said region.

2. In a method of deriving a sine function of a variable quantity electrically, in combination, the steps of establishing an oscillating region containing a standing wave pattern of electric field intensity in at least one direction, continuously projecting electrons through said region at a constant rate in a direction substantially parallel to the electric field at a nodal point in said pattern, controlling the displacement of the beam formed by said electrons from said nodal point in a transverse direction in direct proportion to said variable quantity, whereby the amplitude of the velocity modulation of said beam upon emergence from said region is substantially representative of a sine function of said quantity, and deriving a voltage signal corresponding to the velocity modulation of said beam upon its emergence from said region.

3. In a method of deriving a cosine function of a variable quantity electrically, in combination, the steps of establishing an oscillating region containing a standing wave pattern of electric field intensity in at least one direction, continuously projecting electrons through said region at a constant rate in a direction substantially parallel to the electric field at a maximum point in said pattern, and controlling the displacement of the beam formed by said electrons from said maximum point in a transverse direction in accordance with said variable quantity, whereby the amplitude of the velocity modulation of said beam upon emergence from said region is substantially representative of a cosine function of said quantity.

4. In a method of deriving a sinusoidal function of a variable quantity electrically, in combination, the steps of establishing within a confined region an oscillating electric field having a standing wave pattern of electric field intensity in at least one direction, continuously projecting a constant number of electrons per second into said region in a direction substantially parallel to the electric field, and controlling the point along said standing wave pattern at which said electrons enter said region in direct proportion to said variable quantity.

5. Electrical apparatus for producing a sinusoidal function of an input signal comprising, a cavity resonator having entrance and emergence grids for accommodating a traversing electron beam, an electron gun for projecting a high velocity electron beam through said resonator to be velocity modulated therein, deflecting means responsive to said input signal for controlling the relative positions of said resonator and said traversing beam in accordance with said signal voltage, and means disposed on the emergent side of said resonator for deriving a signal corresponding to the velocity modulation of the emergent beam, the length of said entrance and emergence grids in the direction of beam deflection being substantially greater than the width of said beam in the direction of beam deflection.

6. In apparatus of the character described, in combination, an electron gun for forming a high velocity electron beam, a cavity resonator disposed in the path of said beam to interchange energy therewith, said cavity resonator being so positioned with respect to said beam such that the beam normally enters said resonator in a direction which is parallel to the electric field within said resonator and which is perpendicular to the direction along which the standing wave pattern of electric field extends within said resonator, a deflecting system disposed between said gun and said resonator for deflecting said beam in accordance with an input signal applied to said deflecting system, an audio frequency circuit, means for connecting said circuit to said deflecting system to apply an audio input signal to said deflecting system, said resonator having an entrance grid for premitting said beam to enter said resonator, said entrance grid having a length in the direction of beam deflection substantially greater than the width of the electron beam in the direction of beam deflection 7. In apparatus of the character described, in combination, an electron gun for forming a high velocity electron beam, a cavity resonator disposed in the path of said beam to interchange energy therewith, a deflecting system disposed between said gun and said resonator for deflecting said beam in accordance with an input signal applied to said deflecting system, an audio frequency circuit, means for connecting said circuit to said deflecting system to apply an audio input signal to said deflecting system, said resonator having an entrance grid for permitting said beam to enter said resonator, said entrance grid lying in a plane perpendicular to the undeflected direction of travel of said beam and having a length in the direction of beam deflection substantially greater than the width of the electron beam in the direction of beam deflection.

8. In the apparatus of the character described, in combination, an electron gun for forming a high velocity electron beam, a cavity resonator disposed in the path of said beam to interchange energy therewith, a deflecting system disposed between said gun and said resonator for deflecting said beam in accordance with an input signal applied to said deflecting system, said resonator having an entrance grid, said resonator being positioned with respect to said electron gun such that the standing wave pattern within said resonator extends in a direction perpendicular to the direction of travel of said beam when undeflected and such that the beam, when undeflected, enters said resonator at a maximum of the standing wave pattern, said entrance grid extending along said standing wave pattern for at least a quarter of a wave length thereof.

9. In apparatus of the character described, in combination, an electron gun for forming a high velocity electron beam, a cavity resonator disposed in the path of said beam to interchange energy therewith, a deflecting system disposed between said gun and said resonator for deflecting said beam in accordance with an input signal applied to said deflecting system, and means disposed on the emergent side of said resonator for deriving a voltage signal corresponding to the velocity modulation of said beam as it emerges from said resonator, said resonator having an entrance grid and an emergence grid, said resonator being positioned with respect to said electron gun such that the standing wave pattern within said resonator extends in a direction perpendicular to the undeflected direction of travel of said electron beam, said entrance and emergence grids each having a length in the direction of said standing wave pattern equal to at least a quarter wave length of said pattern.

10. Electrical apparatus for producing a sine function of a signal voltage comprising, a cavity resonator having entrance and emergence grids for accommodating a traversing electron beam, electron gun for projecting a high velocity electron beam through said resonator to be velocity modulated therein, said beam normally traversing said resonator at a nodal point of a standing wave pattern of electric field intensity existing therein, deflecting means responsive to said signal voltage for controlling the relative positions of said resonator and said traversing beam in in proportion to said signal voltage, and means disposed on the emergent side of said resonator for deriving a signal corresponding to the velocity modulation of the emergent beam, said resonator having a length in the direction of beam deflection at least equal to a whole guide wave length.

11. In apparatus of the character described, in combination, an electron gun for forming a high velocity electron beam, a cavity resonator disposed in the path of said beam to interchange energy therewith, an external source of high frequency electromagnetic energy, means forming a connection between said source and said resonator whereby said resonator is energized to oscillate at the frequency of said source, said cavity resonator having a length in the direction perpendicular to said beam at least equal to one whole guide wave length, said cavity resonator being disposed with respect to said beam such that the electrons of said beam normally enter said resonator in a direction parallel to the electric field existing therein and at a nodal point of the standing wave pattern of electric field existing therein, and a deflecting system disposed between said gun and said resonator for transversely deflecting said beam in accordance with an input signal applied to said deflecting system, said resonator having an entrance aperture of substantially greater area than the cross section of said electron beam.

12. Electrical apparatus for producing a cosine function of a signal voltage comprising, a cavity resonator having entrance and emergence grids for accommodating a traversing electron beam, an electron gun for projecting a high velocity electron beam through said resonator to be velocity modulated therein, said beam normally traversing said resonator at a maximum point of a standing wave pattern of electric field intensity existing therein, deflecting means responsive to said signal voltage for controlling the relative positions of said resonator and said traversing beam in proportion to said signal voltage, and means disposed on the emergent side of said resonator for deriving a signal corresponding to the velocity modulation of the emergent beam, the length of said entrance and emergence grids in the direction of beam deflection being substantially greater than the width of said beam in the direction of beam deflection.

13. In a frequency modulation system, in combination, an electron gun for forming a high velocity electron beam, deflecting means associated with said beam, means for applying an input signal to said deflecting means, means disposed in the path of said beam forming an oscillating region containing a standing wave pattern of electric field intensity along the direction of deflection of said deflecting means, and means disposed on the emergent side of said region for deriving a signal corresponding to the velocity modulation of the emergent beam, the length of said entrance and emergence grids in the direction of beam deflection being substantially greater than the width of said beam in the direction of beam deflection.

14. Apparatus, as claimed in claim 13, wherein said region is so disposed with respect to said beam that said beam traverses a node of said pattern under the condition of zero input signal.

15. Apparatus, as claimed in claim 13, wherein said region is so disposed with respect to said beam that said beam traverses a maximum of said pattern under the condition of zero input signal.

16. In a frequency modulation system, in combination, two identical electron guns for forming two identical high velocity electron beams, a separate deflecting system associated with each of said beams, means for applying a common input signal to said deflection systems, a separate cavity resonator disposed in the path of each of said deflected beams to be traversed thereby, means for energizing said resonators to oscillate at a carrier frequency 90° phase displaced from one another, and means responsive to said beams upon their emergence from said resonators for deriving a signal corresponding to the sum of the velocity modulations of said emergent beams.

17. Apparatus, as claimed in claim 16, wherein said resonators are disposed relative to their respective traversing beams such that under the condition of zero input signal one of said resonators is traversed by its respective beam at a nodal point of a standing wave pattern of electric field intensity existing therein, and the other of said resonators is traversed at a maximum point.

18. In a frequency modulation system, in combination, two identical electron guns for forming two identical high velocity electron beams, a separate deflecting system associated with each of said beams, means for applying a common input signal to said deflecting systems, a separate cavity resonator disposed in the path of each of said deflected beams to be traversed thereby, means for energizing said resonators to oscillate at a carrier frequency 90° phase displaced from one another, and unitary means disposed in the path of both of said beams and responsive to the variations in velocity of said beams.

19. Apparatus, as claimed in claim 18, wherein said resonators are disposed relative to their respective traversing beams such that under the condition of zero input signal one of said resonators is traversed by its respective beam at a nodal point of a standing wave pattern of electric field intensity existing therein, and the other of said resonators is traversed at a maximum point.

20. Electric discharge apparatus comprising an evacuated container, two identical electron guns disposed at opposite extremities of said container for forming two identical high velocity inwardly projected electron beams, two oppositely disposed deflecting systems associated with said beams, respectively, for deflecting said beams in accordance with an input signal, two oppositely disposed cavity resonators arranged to be traversed by said deflected beams, respectively, for velocity modulating said beams, and a single centrally located electrode disposed in the path of said beams, said electrode being maintained at a negative potential with respect to said electron guns.

21. In a frequency modulation system, in combination, an electron gun for forming a high velocity electron beam, a deflecting system associated with said beam, means for applying an input signal to said deflecting system, a first and a second cavity resonator disposed in the path of said beam subsequent to said deflecting system to be successively traversed thereby, means for energizing said resonators to oscillate at a carrier frequency, and means responsive to said beam upon its emergence from said second resonator for deriving a signal corresponding to the velocity modulation of said beam, each of said resonators having an entrance and an emergence grid for accommodating said beam, each of said grids having a cross sectional area substantially greater than that of said beam.

22. Apparatus, as claimed in claim 21, wherein said resonators are separated by a distance such that the travel time of the electron beam therebetween is equal to an odd number of quarter periods of the carrier frequency.

23. Apparatus, as claimed in claim 21, wherein said resonators are arranged relative to said electron beam such that under the conditions of zero input signal said beam traverses one of said resonators at a nodal point of a standing wave pattern of electric field existing therein, and traverses the other resonator at a maximum point.

24. Apparatus, as claimed in claim 21, wherein said resonators are arranged relative to said electron beam such that under the conditions of zero input signal said beam traverses one of said resonators at a nodal point of a standing wave pattern of electric field existing therein and traverses the other resonator at a maximum point, and wherein said resonators are separated by a distance such that the travel time of the electron beam therebetween is equal to an odd number of quarter periods of the carrier frequency.

25. Electric discharge apparatus comprising an evacuated container, an electron gun disposed at one end of said container for forming a high velocity electron beam, a deflecting system associated with said beam for deflecting said beam in accordance with an input signal, two successively disposed cavity resonators arranged to be traversed by said deflected beam for velocity modulating said beam, and a plate electrode disposed in the path of said velocity modulated beam, said electrode being maintained at a negative potential with respect to said electron gun.

26. In a method of deriving a sinusoidal function of a variable input signal electrically, the steps of establishing within a substantially confined region an oscillating electric field having a standing wave pattern of electric field intensity extending in at least one direction and having a frequency substantially higher than that of said input signal, projecting a constant number of electrons per second into said region in a direction substantially parallel to the electric field, and varying the point of entry of said electrons into said region over a continuous and substantial portion of said standing wave pattern in accordance with said input signal.

27. In a method of deriving a sinusoidal function of a variable input signal electrically, in combination, the steps of establishing an oscillating region containing a standing wave pattern of electric field intensity extending in at least one direction, projecting electrons through said region at a constant rate in a direction substantially parallel to the electric field, varying the line of traversal of said region by the beam formed of said electrons in direct proportion to said variable input signal, and deriving a voltage signal corresponding to the velocity modulation of said beam upon its emergence from said region.

28. Electric discharge apparatus comprising an evacuated container, two identical electron guns disposed at opposite extremities of said container for forming two identical high velocity inwardly projected electron beams, two oppositely disposed deflecting systems associated with said beams, respectively, for deflecting said beams in accordance with an input signal, two oppositely disposed cavity resonators arranged to be traversed by said deflected beams, respectively, for velocity modulating said beams, and centrally located unitary means disposed in the path of both of said beams and responsive to the variations in velocity of said beams.

29. In apparatus of the character described, in combination, an electron gun for forming a high velocity electron beam, a cavity resonator disposed in the path of said beam to velocity modulate said beam, said resonator having an entrance aperture to accommodate said beam, an external source of high frequency electromagnetic energy, means forming a connection between said source and said resonator whereby said resonator is energized to oscillate at the prequency of said source, and a deflecting system disposed between said gun and said resonator for deflecting said beam in accordance with an input signal applied to said deflecting system.

30. In apparatus of the character described, in combination, an electron gun for forming a high velocity electron beam, a cavity resonator disposed in the path of said beam to velocity modulate said beam, said resonator having an entrance aperture to accommodate said beam, an external source of high frequency electromagnetic energy, means forming a connection between said source and said resonator whereby said resonator is energized to oscillate at the frequency of said source, and a deflecting system disposed between said gun and said resonator for deflecting said beam in accordance with an input signal applied to said deflecting system, said entrance aperture having a length in the direction of beam deflection greater than the width of said beam in the direction of beam deflection.

GEORGE H. LEE.

REFERENCES CITED

The following references are of record in the file of this patent:

UNITED STATES PATENTS

| Number | Name | Date |
|---|---|---|
| 2,275,480 | Varian et al. | Mar. 10, 1942 |
| 2,281,935 | Hansen et al. | May 5, 1942 |
| 2,399,325 | Condon | Apr. 30, 1946 |
| 2,404,078 | Malter | July 16, 1946 |
| 2,407,298 | Skellett | Sept. 10, 1946 |
| 2,418,735 | Strutt et al. | Apr. 8, 1947 |

FOREIGN PATENTS

| Number | Country | Date |
|---|---|---|
| 117,561 | Australia | Sept. 28, 1943 |